United States Patent
Rathbun, II et al.

(10) Patent No.: US 8,925,025 B2
(45) Date of Patent: Dec. 30, 2014

(54) SYSTEM AND METHOD OF PROVIDING ACCESS TO CONTENT OF AN INTERRUPTED DIGITAL BROADCAST SIGNAL

(75) Inventors: Dale Rathbun, II, Monroe, MI (US); Christopher Charles Detering, Ann Arbor, MI (US); Conley Miller, Wyandotte, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1521 days.

(21) Appl. No.: 12/196,611

(22) Filed: Aug. 22, 2008

(65) Prior Publication Data

US 2010/0050207 A1 Feb. 25, 2010

(51) Int. Cl.
| H04N 7/173 | (2011.01) |
| H04N 5/76 | (2006.01) |
| H04N 21/231 | (2011.01) |
| H04N 21/24 | (2011.01) |
| H04N 21/433 | (2011.01) |
| H04N 21/482 | (2011.01) |
| H04N 21/654 | (2011.01) |
| H04N 5/765 | (2006.01) |
| H04N 5/775 | (2006.01) |

(52) U.S. Cl.
CPC .............. *H04N 7/17318* (2013.01); *H04N 5/76* (2013.01); *H04N 21/23106* (2013.01); *H04N 21/2402* (2013.01); *H04N 21/4331* (2013.01); *H04N 21/482* (2013.01); *H04N 21/654* (2013.01); *H04N 5/765* (2013.01); *H04N 5/775* (2013.01)

USPC .............. 725/115; 725/86; 725/88; 725/105; 725/134; 725/142; 725/145; 725/28; 725/29

(58) Field of Classification Search
None
See application file for complete search history.

(56) References Cited

U.S. PATENT DOCUMENTS

| 5,928,327 | A | 7/1999 | Wang et al. |
| 6,609,253 | B1 * | 8/2003 | Swix et al. ....................... 725/88 |
| 6,876,835 | B1 | 4/2005 | Marko et al. |
| 7,269,775 | B2 | 9/2007 | Pendakur et al. |
| 7,363,569 | B2 | 4/2008 | Pendakur et al. |
| 7,437,750 | B1 * | 10/2008 | Sonoda et al. .................. 725/61 |
| 8,006,275 | B1 * | 8/2011 | Poole et al. ....................... 725/96 |
| 2003/0041332 | A1 | 2/2003 | Allen et al. |
| 2003/0149988 | A1 * | 8/2003 | Ellis et al. ......................... 725/87 |
| 2005/0083929 | A1 | 4/2005 | Salo et al. |
| 2006/0156372 | A1 | 7/2006 | Cansler, Jr. et al. |
| 2006/0168610 | A1 | 7/2006 | Williams et al. |
| 2007/0056001 | A1 | 3/2007 | Hules |

* cited by examiner

*Primary Examiner* — Jun Fei Zhong
(74) *Attorney, Agent, or Firm* — Toler Law Group, PC

(57) ABSTRACT

A system and method of providing access to content of an interrupted digital broadcast is disclosed. A digital broadcast connection is established between a digital broadcast provider and at least one receiver. The digital broadcast connection is monitored and upon detecting an interruption in the digital broadcast connection, content of the interrupted digital broadcast signal is stored. A message is sent to the at least one receiver to indicate that the content of the interrupted digital broadcast signal is available.

19 Claims, 5 Drawing Sheets

SYSTEM AND METHOD OF PROVIDING ACCESS TO CONTENT OF AN INTERRUPTED DIGITAL BROADCAST SIGNAL

FIELD OF THE DISCLOSURE

The present disclosure is generally related to a system and method of providing access to content of an interrupted digital broadcast signal.

BACKGROUND

Modern communication networks are used by content providers to deliver media content, such as movies, television shows and other programs, to its subscribers through digital broadcast signals. The connection between the content provider and receivers may experience an interruption or temporary signal loss that causes the affected subscribers to miss a portion of the broadcast they were viewing. The subscriber may not be able to view the missed portion of the broadcast unless the missed portion is subsequently re-broadcast by the content provider or made available through another form of media.

DETAILED DESCRIPTION

Figure 1:
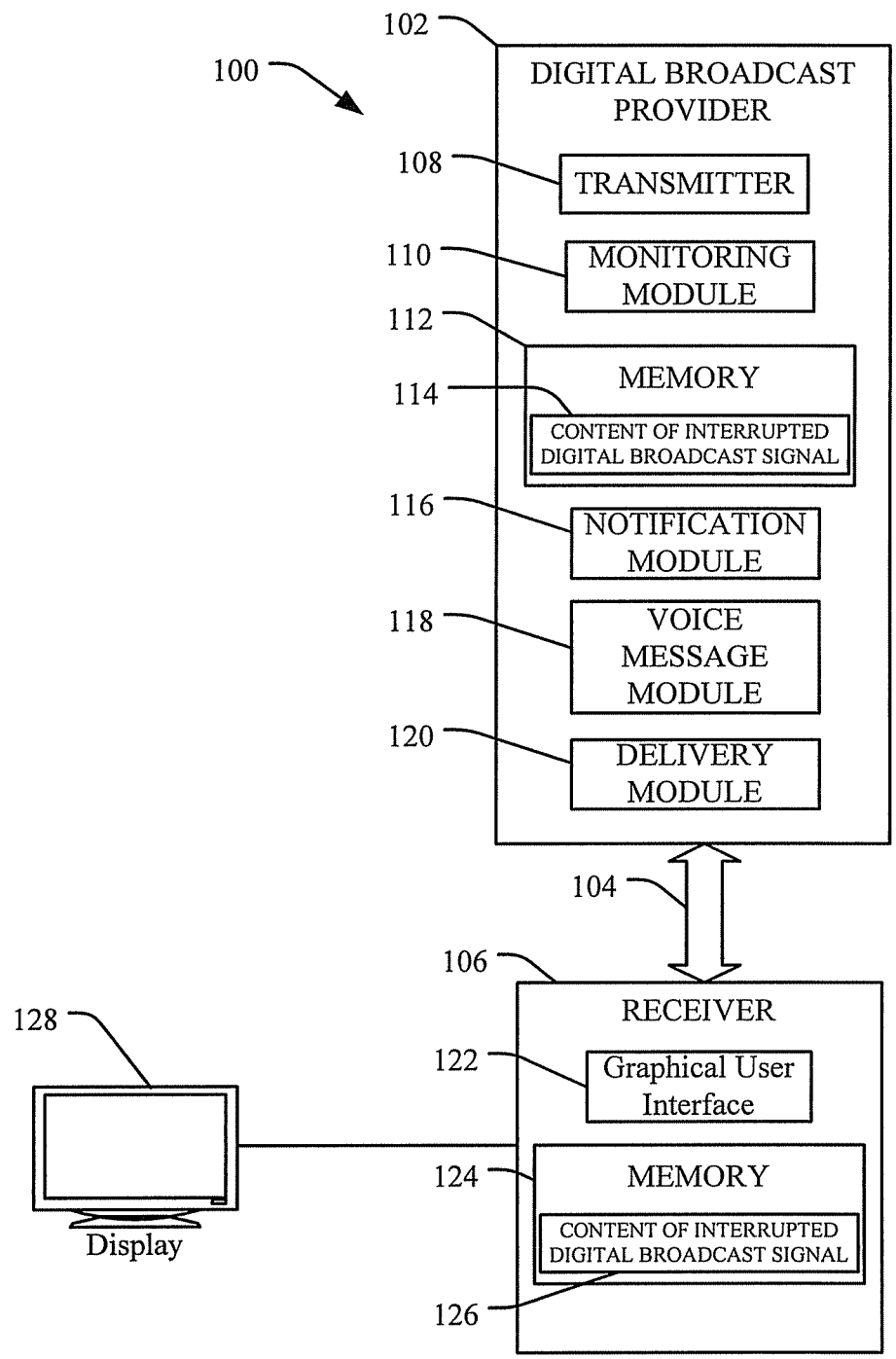
FIG. 1 is a block diagram of a particular illustrative embodiment of system of providing access to content of an interrupted digital broadcast signal.

In a particular embodiment, a method of providing access to content of an interrupted digital broadcast signal is disclosed. The method includes establishing a digital broadcast connection between a digital broadcast provider and at least one receiver and providing a digital broadcast signal to the at least one receiver using the digital broadcast connection. The method further includes monitoring the digital broadcast connection and when an interruption in the digital broadcast connection is detected, storing content including at least a portion of the digital broadcast signal communicated during an interruption period. In addition the method further includes sending a first message to the at least one receiver after the digital broadcast signal is reestablished to indicate that at least the portion of the digital broadcast signal communicated during the interruption period is available.

In another embodiment, a system of providing access to content of an interrupted digital broadcast signal is disclosed. The system includes a transmitter to transmit a digital broadcast signal from a digital broadcast provider to at least one receiver and a monitoring module to detect an interruption in a digital broadcast connection between the digital broadcast provider and the at least one receiver. The system also includes a notification module configured to send a message to the at least one receiver to indicate that the content of the interrupted digital broadcast signal is available for transmission.

In another embodiment, the system includes at least one receiver to receive a digital broadcast signal from a digital broadcast provider. The at least one receiver is adapted to receive a message from the digital broadcast provider to indicate that content of an interrupted digital broadcast signal is available for transmission.

In another embodiment, a computer-readable storage medium is disclosed. The computer-readable storage medium includes operational instructions, that when executed by a processor at a digital broadcast server, cause a transmitter to transmit a digital broadcast signal to at least one receiver to establish a digital broadcast connection. The computer-readable storage medium also includes operational instructions, that when executed by the processor, cause the processor to monitor the digital broadcast connection. In addition, the computer-readable storage medium further includes operational instructions, that when executed by the processor, cause the processor to store content of the interrupted digital broadcast signal after detection of an interruption in the digital broadcast connection and cause the processor to send a message to the at least one receiver to indicate that the content of the interrupted digital broadcast signal is available for transmission.

In another particular embodiment, a graphical user interface for accessing content of an interrupted digital broadcast signal is disclosed. The graphical user interface includes a list of interrupted programs that correspond to programs that are available for downloading or viewing and a date and time of interruption corresponding to each program on the list of interrupted programs. The graphical user interface further includes a channel that corresponds to each program on the list of interrupted programs and an expiration date for each program on the list of interrupted programs.

FIG. 1 is a block diagram of a system of providing access to content of an interrupted digital broadcast signal, generally designated 100. The system 100 includes a digital broadcast provider 102 that is coupled to at least one receiver 106 via a digital broadcast connection 104. A transmitter 108 of the digital broadcast provider 102 is adapted to transmit a digital broadcast signal from the digital broadcast provider 102 to the at least one receiver 106. A monitoring module 110 is adapted to detect an interruption in the digital broadcast connection 104 between the digital broadcast provider 102 and the at least one receiver 106.

A memory 112 of the digital broadcast provider 102 may be adapted to store content of an interrupted broadcast signal 114. In a particular illustrative embodiment, the content of the interrupted digital broadcast signal 114 may include content from a scheduled beginning of a program to a scheduled end of the program. A notification module 116 of the digital broadcast provider 102 may be adapted to send a first message to the at least one receiver 106 to indicate that the content of the interrupted digital broadcast signal 114 is available for transmission. The first message may include a time of the interruption, a duration of the interruption, a channel of the interruption or a time limit indicating when the content of the interrupted digital broadcast signal 114 will expire and then be removed from the memory 112. The notification module 116 may be adapted to send a second message to the at least one receiver 106 to again indicate that the content of the interrupted digital broadcast signal 114 is available for transmission after not receiving a response to the first message. A voice message module 118 is configured to provide a voice message to a telephone number corresponding to the at least one receiver 106. The voice message indicates that the content of the interrupted digital broadcast signal 114 is available for transmission. For example, the voice message may include a statement that, "the American Idol program interrupted on May 14, 2008, on Channel 8, is now available for transmission until May 28, 2008, using your receiver." A user may then use the receiver 106 to request the content of the interrupted digital broadcast signal 114 for transmission. In a particular embodiment, the voice message may include instructions for a user to request the content of the interrupted digital broadcast signal 114 using a telephone. A delivery module 120 is adapted to deliver the content of the stored interrupted digital broadcast signal 114 to the receiver 106 in response to receiving a request.

A graphical user interface 122 of the receiver 106 is configured for responding to messages from the digital broadcast provider 102 indicating that the content of the interrupted digital broadcast signal 114 is available for transmission. The content of the interrupted digital broadcast signal 114 may be downloaded and stored in memory 124 of the receiver so that the downloaded content of the interrupted digital broadcast signal 126 is available for viewing on a display 128.

Figure 2:
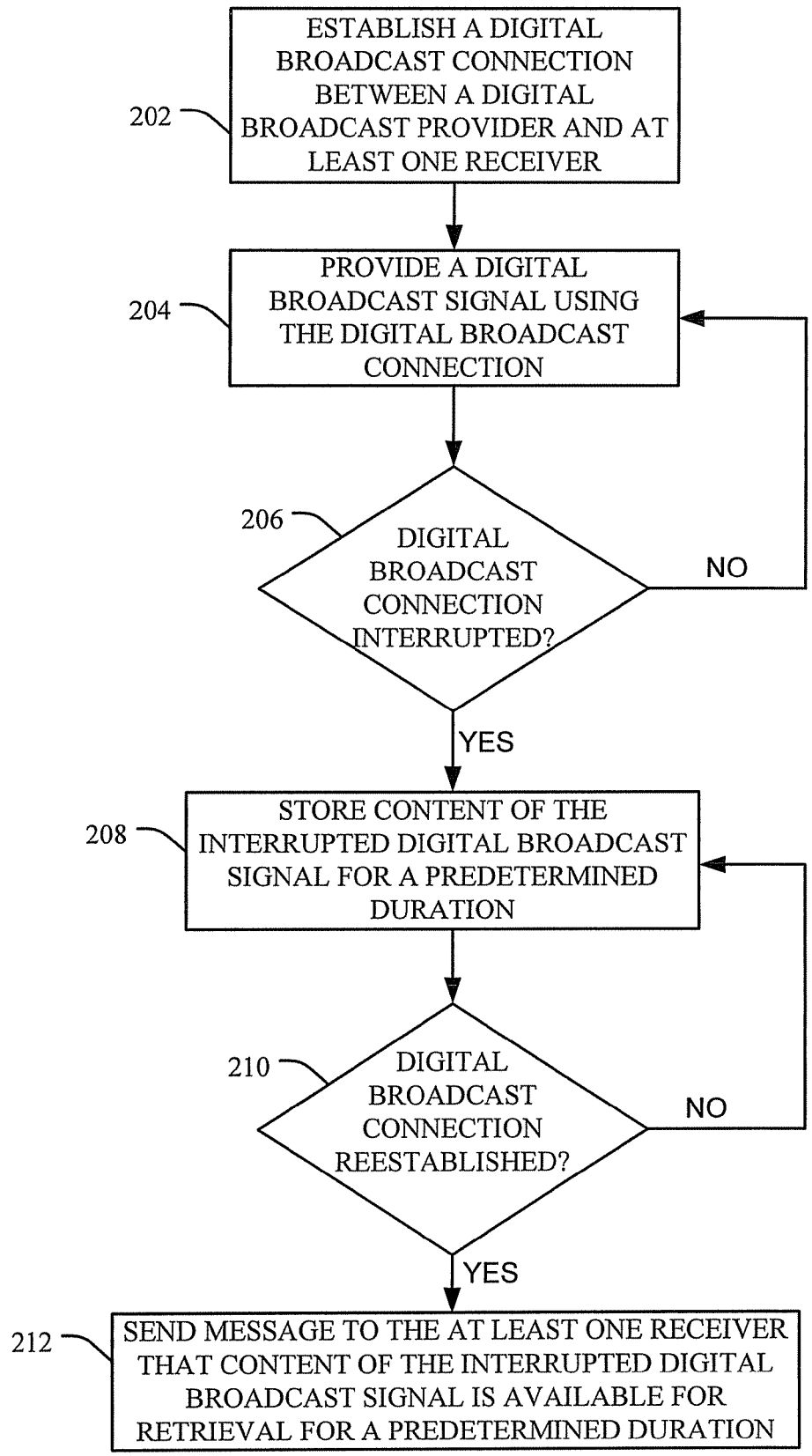
FIG. 2 is a flow chart of a particular illustrative embodiment of a method of providing access to content of an interrupted digital broadcast signal.

FIG. 2 is a flow diagram of a particular illustrative embodiment of a method of providing access to content of an interrupted digital broadcast signal. In an illustrative embodiment, the method may be performed by the digital broadcast provider 102 depicted in FIG. 1. A digital broadcast connection is established between a digital broadcast provider and at least one receiver, at 202. Continuing to 204, a digital broadcast signal is provided using the digital broadcast connection. The method monitors the digital broadcast connection and detects whether the digital broadcast connection is interrupted, at 206. If an interruption in the digital broadcast connection is detected, then content of the interrupted digital broadcast signal is stored by the digital broadcast provider, at 208. The content includes at least a portion of the digital broadcast signal communicated during an interruption period. The content of the interrupted digital broadcast signal is stored for a predetermined time duration by the digital broadcast provider. In a particular illustrative embodiment, the content of the interrupted digital broadcast signal may be stored for thirty days. In a particular illustrative embodiment, the content of the interrupted digital broadcast signal may include content of a program from a point when the interruption is detected to a scheduled end of the program. In another illustrative embodiment, the content of the interrupted digital broadcast signal may include content from a scheduled beginning of a program to a scheduled end of the program.

Proceeding to 210, the method detects whether the digital broadcast connection is reestablished between the digital broadcast provider and the at least one receiver. After detecting that the digital broadcast connection has been reestablished, a first message is sent to the at least one receiver that the content of the interrupted digital broadcast signal is available for retrieval, at 212. The first message may include a time of the interruption, a duration of the interruption, or a channel of the interruption. If no response is received to the first message within a predetermined duration, a second message may be sent to the at least one receiver to again indicate that the content of the interrupted digital broadcast signal is available for transmission to the receiver. In particular illustrative embodiment, the second message is sent if no response is received to the first message within ten days. In addition, an automated voice message that an interrupted digital broadcast signal is available for transmission may be sent to a telephone number corresponding to the receiver affected by an interrupted digital broadcast signal. In an illustrative embodiment, the automated voice message may include a statement of a time of an interruption, a duration of the interruption, and a channel of the interruption to inform a user of the receiver that the content is available. For example, the telephone number may be obtained from a subscriber database. The stored content may be transmitted to the at least one receiver after receiving a request from the user via the at least one receiver, and the stored content may be removed from storage after transmitting to the at least one receiver.

Figure 3:
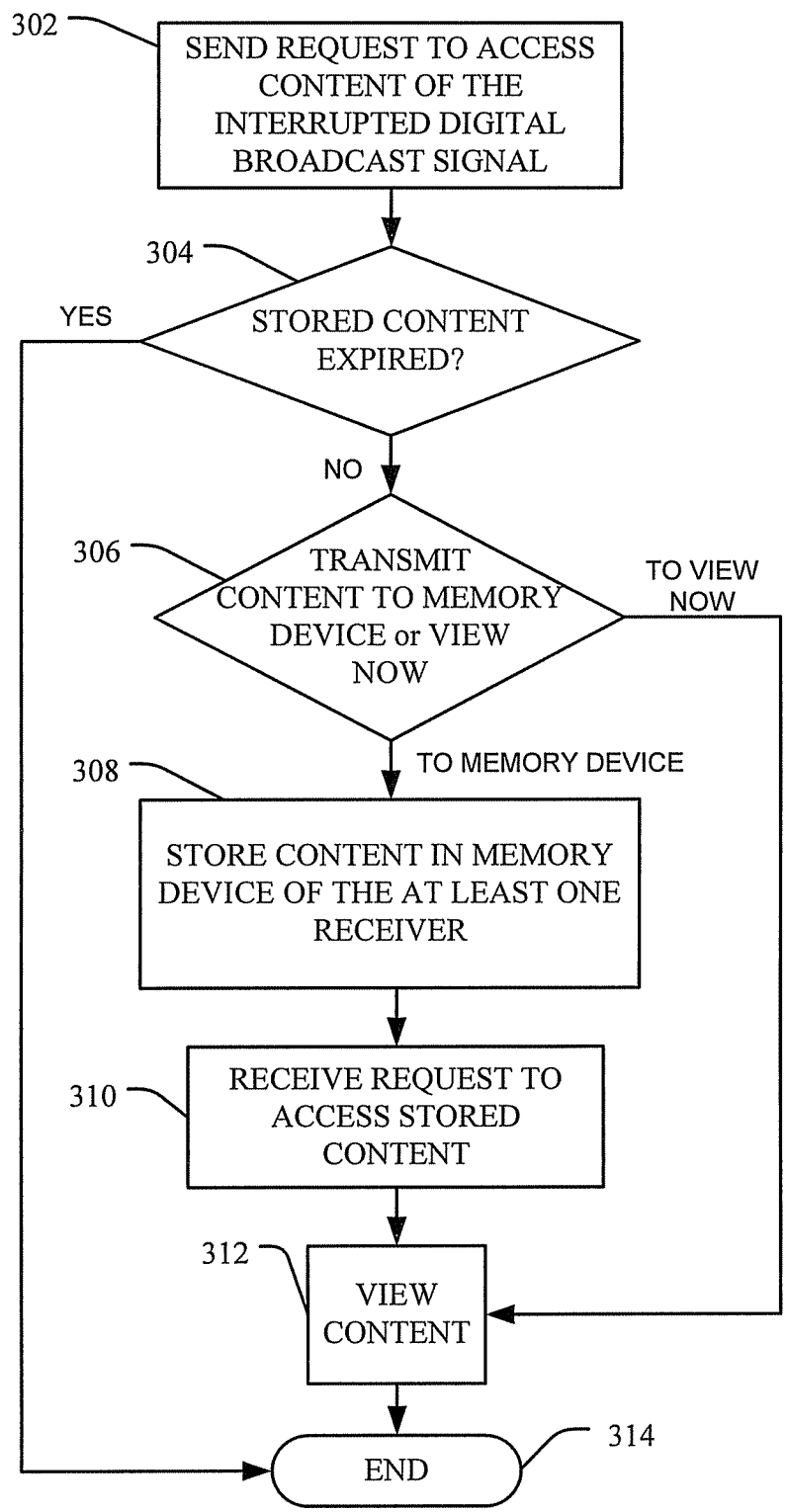
FIG. 3 is a flow chart of a particular illustrative embodiment of a method of downloading content to a receiver.

Referring to FIG. 3, after the at least one receiver receives the message (e.g., the first or second message) that the content of the interrupted digital broadcast signal is available for retrieval, the at least one receiver may send a request to access the content of the interrupted broadcast signal, at 302. In an illustrative embodiment, the at least one receiver may be the receiver 106 of FIG. 1. The method determines whether the content stored by the digital broadcast provider has been stored for a length of time that exceeds the predetermined duration and has expired, so that the content is no longer in storage and available for transmission, at 304. For example, if it is determined, at 304, that the content has expired, then the method ends, at 314. If, at 304, the content stored by the digital broadcast provider has not expired, then the method determines whether to transmit the content of the interrupted broadcast signal to a memory device of the at least one receiver, at 306, or to view the content, or both. If it is determined, at 306, that the content is to be transmitted, the method includes storing the content, at 308. Viewing the content now is shown, at 312. The stored content of the interrupted digital broadcast may be removed from storage at the digital broadcast provider after transmitting the stored content of the interrupted digital broadcast signal to the receiver.

Continuing to 310, a request may be received at the receiver to access the stored content of the interrupted broadcast signal stored in the memory device of the at least one receiver and to view the content, at 312. The content is then accessed from the memory device and transmitted to a display for contemporaneous viewing.

Figure 4:
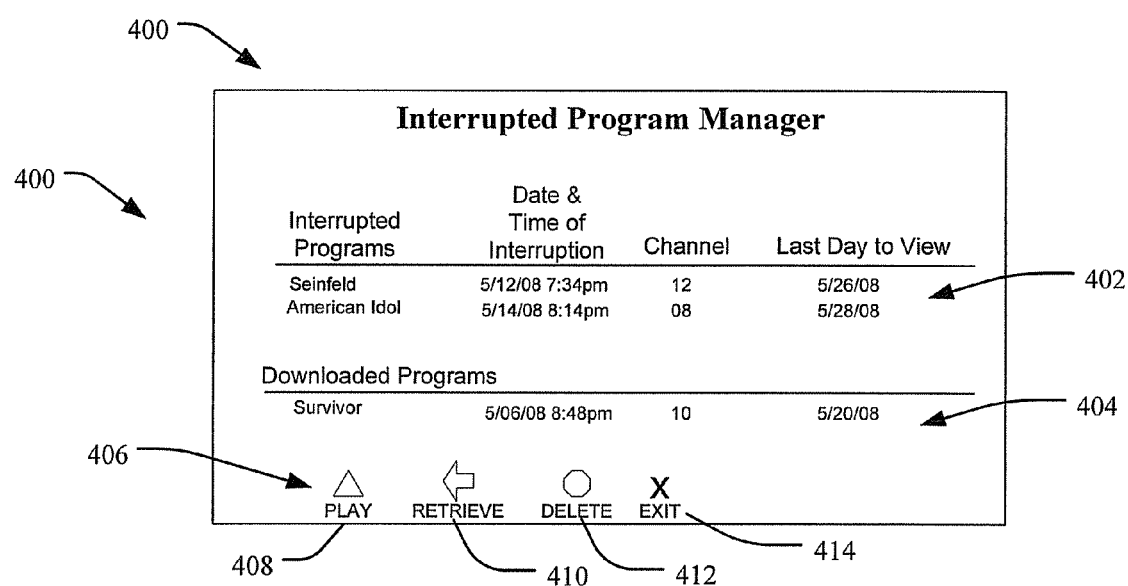
FIG. 4 is a general diagram of a graphical user interface that can be used for accessing content of an interrupted digital broadcast signal.

Referring to FIG. 4, a particular illustrative embodiment of a graphical user interface (GUI) is shown and is generally designated 400. The GUI 400 can be presented to a user at the display, such as a television, during operation of the system 100. In one embodiment, the GUI 400 includes an interrupted program list 402, a downloaded program list 404, and an action list 406. The interrupted program list 402 can contain a list of interrupted programs that are available to be downloaded or viewed (in whole or part) at the display. The interrupted program list 402 also can include a time of the beginning of the interruption, a duration of the interruption, a channel of the interruption and a time limit indicating when the interrupted digital broadcast signal will be removed from storage of the digital broadcast provider. The downloaded program list 404 can include a list of interrupted programs that have been downloaded to a receiver 106 (FIG. 1), e.g., to the memory 124 (FIG. 1), and that are available to be viewed at the display 128 (FIG. 1). The downloaded program list 404 also can include a time of the beginning of the interruption, a duration of the interruption, a channel of the interruption, and a time limit indicating when the interrupted digital broadcast signal will be removed from memory of a receiver (e.g., memory 124 of the receiver 106, as shown in FIG. 1).

FIG. 4 shows that the action list 406 can include a soft key 408 that is labeled "play", a soft key 410 that is labeled "retrieve", a soft key 412 that is labeled "delete", and a soft key 414 labeled "exit". In a particular embodiment, the labels attached to the soft keys 408, 410, 412, 414 indicate the functionality of each soft key. For example, when the "play"

soft key 408 is selected, a video file can be broadcast to the display from the memory in the digital broadcast provider or from the receiver. The "retrieve" soft key 410 can be selected in order to send a request to the digital broadcast provider to transmit the desired program to the memory of the receiver 106 (FIG. 1). Further, the "delete" soft key 412 can be selected, e.g., to remove a program title from the interrupted program list or the downloaded program list. The "exit" soft key 414 can be selected to exit the GUI 400.

Figure 5:
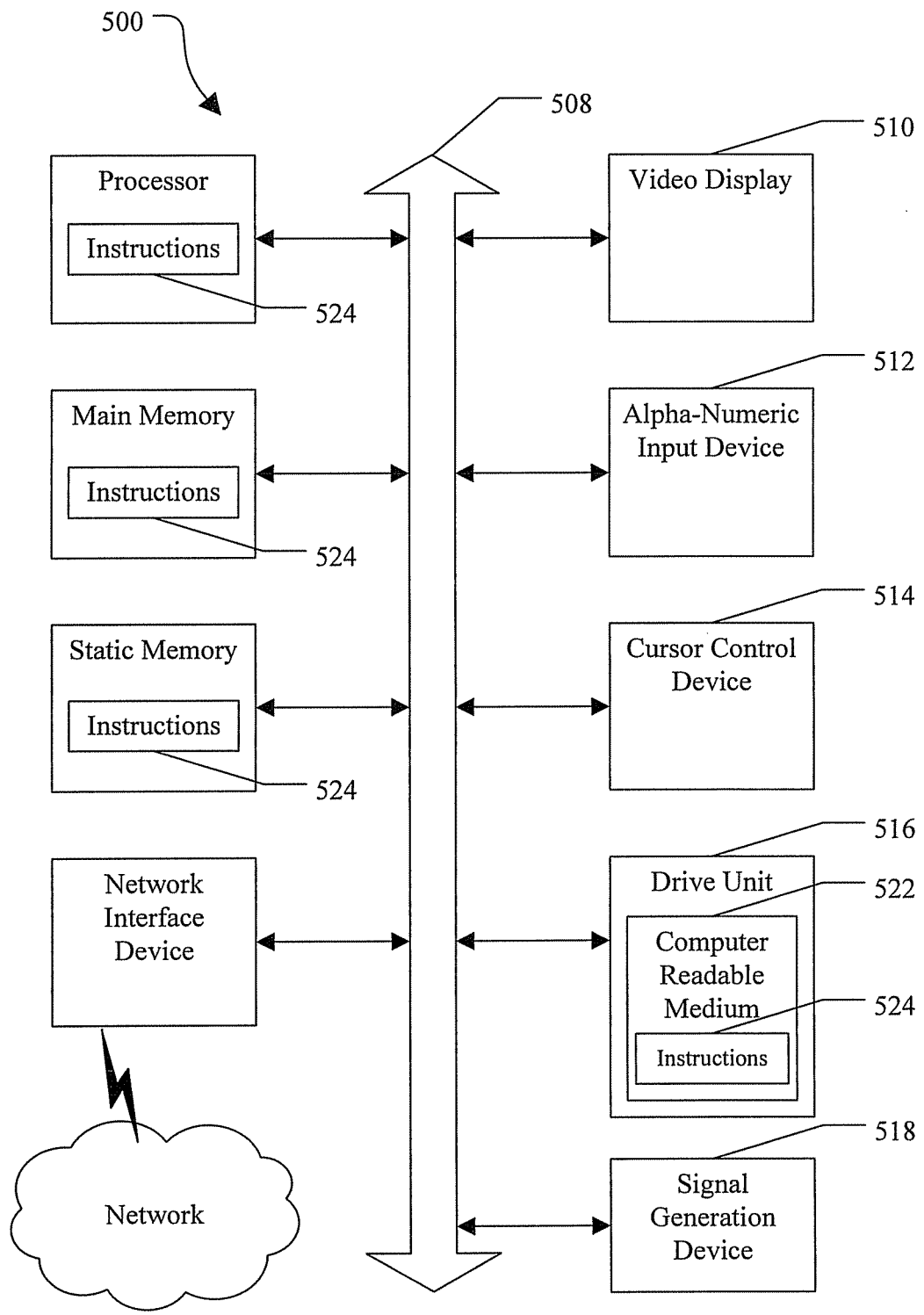
FIG. 5 is a block diagram of an illustrative embodiment of a general computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500, or any portion thereof, may operate as a standalone device or may be connected, e.g., using a network, to other computer systems or peripheral devices, including a digital broadcast provider or receiver, as shown in FIG. 1.

In a networked deployment, the computer system may operate in the capacity of a digital broadcast provider, receiver, or any combination thereof. In an illustrative embodiment, the computer system may be implemented by the digital broadcast provider to store content of programs and to communicate with at least one receiver. The computer system 500 can also be implemented as or incorporated into various devices, such as a set top box (STB), a receiver, a personal computer (PC), a tablet PC, a media device, a personal digital assistant (PDA), a mobile device, a palmtop computer, a laptop computer, a desktop computer, a communications device, a wireless telephone, a land-line telephone, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics-processing unit (GPU), or both. Moreover, the computer system 500 can include a main memory 504 and a static memory 506 that can communicate via a bus 508. As shown, the computer system 500 may further include a video display unit 510, such as a liquid crystal display (LCD), a projector, a flat panel display, a solid-state display, or a cathode ray tube (CRT). Additionally, the computer system 500 may include an input device 512, such as a keyboard, and a cursor control device 514, such as a mouse or a remote control device. The computer system 500 can also include a disk drive unit 516, a signal generation device 518, such as a speaker, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media. For example, the instructions 524 may include instructions to cause a transmitter to transmit a digital broadcast signal to at least one receiver to establish a digital broadcast connection, to cause the processor to monitor the digital broadcast connection, to store content of the interrupted digital broadcast signal upon detection of an interruption in the digital broadcast connection, and to send a message to the at least one receiver to indicate that the content of the interrupted digital broadcast signal is available for transmission; such as may be performed by the digital broadcast provider 102 of FIG. 1.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal, so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying out a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. A digital file attachment to an email or other self-contained information archive or set of archives may be considered an equivalent to a tangible storage medium. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein.

Although the present specification describes components and functions that may be implemented in particular embodiments with reference to particular standards and protocols, the invention is not limited to such standards and protocols. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.52(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
sending a digital broadcast signal from a digital broadcast provider to at least one receiver using a digital broadcast connection;
monitoring the digital broadcast connection;
storing first content including at least a portion of the digital broadcast signal communicated during an interruption period, wherein the digital broadcast connection to the at least one receiver is interrupted during the interruption period, and wherein the first content includes content of an interrupted program;
sending a first message to the at least one receiver after the digital broadcast signal is reestablished to indicate that the first content is available for retrieval, wherein the first message enables the at least one receiver to display a graphical user interface including a list of interrupted programs that are available to download or view, and wherein the list of interrupted programs includes the interrupted program;
sending a second message to the at least one receiver to indicate that the first content remains available for transmission; and
sending an automated voice message to a telephone number corresponding to the at least one receiver to indicate that the first content is available for transmission, wherein the automated voice message includes instructions that enable a user to request the first content via a communication device.

2. The method of claim 1, wherein the digital broadcast provider stores the first content for a particular time duration.

3. The method of claim 2, wherein the first content comprises the content of the interrupted program from a point when the interruption is detected to a scheduled end of the interrupted program.

4. The method of claim 1, wherein the first message includes a duration of the interruption.

5. The method of claim 1, further comprising transmitting the first content to the at least one receiver in response to receiving a request from the at least one receiver.

6. The method of claim 5, wherein the at least one receiver comprises memory to store the first content for a particular time duration.

7. The method of claim 5, further comprising removing the first content from storage after transmitting the first content to the at least one receiver.

8. The method of claim 1, wherein the second message is sent after expiration of a particular time period and prior to receiving a response associated with the first message, the particular time period occurring after the first message is sent.

9. The method of claim 1, wherein the graphical user interface includes an expiration date corresponding to each interrupted program in the list of interrupted programs.

10. The method of claim 9, wherein the expiration date of each interrupted program indicates when each interrupted program is to be removed from storage.

11. The method of claim 1, wherein the graphical user interface indicates a time of interruption corresponding to each interrupted program in the list of interrupted programs.

12. The method of claim 1, wherein the first message indicates a time of the interruption, a duration of the interruption, a channel of the interruption, and a time limit indicating when the first content of the digital broadcast signal is to be removed from storage.

13. A system, comprising:
a transmitter to transmit a digital broadcast signal from a digital broadcast provider to at least one receiver;
a monitoring module to detect an interruption in a digital broadcast connection between the digital broadcast provider and the at least one receiver during an interruption period;

a notification module configured to:
send a first message to the at least one receiver to indicate that first content of the digital broadcast signal is available for transmission, wherein the first content includes at least a portion of the digital broadcast signal communicated during the interruption period, wherein the first content includes content of an interrupted program, wherein the first message enables the at least one receiver to display a graphical user interface including a list of interrupted programs that are available to download or view, wherein the list of interrupted programs includes the interrupted program; and
send a second message to the at least one receiver to indicate that the first content remains available for transmission; and
a voice message module to provide a voice message to a telephone number corresponding to the at least one receiver, wherein the voice message indicates that the first content of the digital broadcast signal is available for transmission, wherein the voice message includes instructions that enable a user to request the first content via a communication device.

14. The system of claim 13, further comprising a memory device to store the first content of the digital broadcast signal after the interruption in the digital broadcast connection is detected.

15. The system of claim 14, wherein the first message comprises a time limit indicating when the first content of the digital broadcast signal is to be removed from the memory device.

16. The system of claim 13, wherein the first content of the digital broadcast signal comprises the content of the interrupted program from a scheduled beginning of the interrupted program to a scheduled end of the interrupted program, and wherein a first time of interruption corresponding to a first interrupted program in the list of interrupted programs is different from a second time of interruption corresponding to a second interrupted program in the list of interrupted programs.

17. The system of claim 13, further comprising a delivery module operable to deliver the first content of the digital broadcast signal to the at least one receiver.

18. A computer-readable storage device storing instructions that, when executed by a processor, cause the processor to perform operations comprising:
causing a transmitter to transmit a digital broadcast signal to at least one receiver to establish a digital broadcast connection;
monitoring the digital broadcast connection to detect an interruption in the digital broadcast connection;
storing first content of the digital broadcast signal during the interruption, wherein the first content includes content of an interrupted program;
sending a first message to the at least one receiver to indicate that the first content of the digital broadcast signal is available for transmission, wherein the first message enables the at least one receiver to display a graphical user interface including a list of interrupted programs that are available to download or view, and wherein the list of interrupted programs includes the interrupted program;
sending a second message to the at least one receiver to indicate that the first content remains available for transmission; and
sending an automated voice message to a telephone number corresponding to the at least one receiver to indicate that the first content is available for transmission, wherein the automated voice message includes instructions that enable a user to request the first content via a communication device.

19. The computer-readable storage device of claim 18, wherein the operations further comprise transmitting the stored first content of the digital broadcast signal to the receiver in response to receiving a request, and wherein the second message is sent after expiration of a particular time period and prior to receiving a response associated with the first message, the particular time period occurring after the first message is sent.

* * * * *